United States Patent [19]

Roth et al.

[11] 4,447,458

[45] May 8, 1984

[54] METHOD OF AND APPARATUS FOR PRODUCING AND PROCESSING FROZEN CONFECTIONS

[75] Inventors: Thomas E. Roth, Sylvania; Harlan R. Getman, Toledo, both of Ohio

[73] Assignee: Vroman Foods, Inc., Toledo, Ohio

[21] Appl. No.: 383,793

[22] Filed: Jun. 1, 1982

[51] Int. Cl.³ .......................... A23G 9/00; A23G 9/22
[52] U.S. Cl. .................................. 426/275; 426/101; 366/150; 366/154; 425/133.1; 425/130; 425/96; 425/101
[58] Field of Search ............... 426/275, 100, 101, 565, 426/566, 567, 274; 366/150, 154; 425/96, 101, 133.1, 130

[56] References Cited

U.S. PATENT DOCUMENTS

| | | | |
|---|---|---|---|
| 2,190,226 | 2/1940 | Alexander | 426/565 |
| 2,521,403 | 9/1950 | Overland | 426/101 |
| 2,576,842 | 11/1951 | Lehner | 426/565 |
| 3,576,648 | 4/1971 | Goodman | 426/101 |
| 4,001,439 | 1/1977 | Zonni | 62/66 |

*Primary Examiner*—Jeanette M. Hunter
*Attorney, Agent, or Firm*—Wilson, Fraser, Barker & Clemens

[57] ABSTRACT

A method of and apparatus for automatically impinging or impressing bits or pieces of edible material such as bits or pieces of chocolate, chopped nuts or bits and pieces of other particulate edible material onto the periphery of a body or column of soft freezable confection such as a body of soft ice cream, ice milk or the like. The bits or pieces of edible material are agitated or vibrated as the edible material is fed to the periphery of a body or column of soft confection. The body or column of soft confection and the bits or pieces of particulate edible material on the periphery of the body or column of soft confection are moved through a restriction to impress or embed the bits or pieces of particulate edible material in the periphery of the soft column of freezable confection.

The method and apparatus of the invention include an adjustable means for controlling the delivery of bits or pieces of edible solid to the moving column of soft freezable confection to thereby regulate the amount of pieces or bits of edible solids assembled with the column of freezable confection.

The soft body or column of confection bearing bits or pieces of particulate edible material is severed into sections and the sections assembled with cookies to form composite products and the products subjected to refrigeration or reduced temperature to solidify or freeze the confection.

25 Claims, 8 Drawing Figures

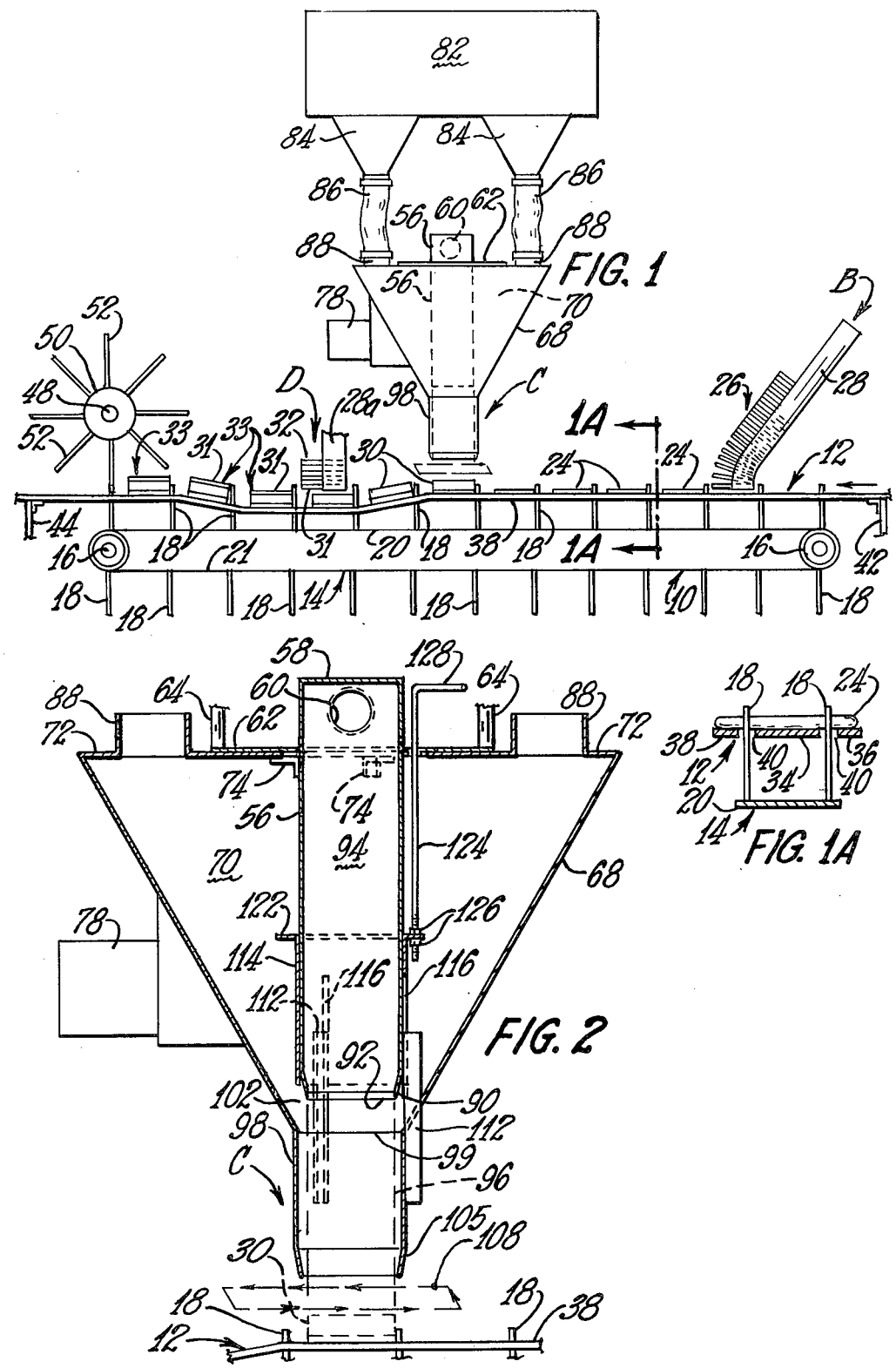

METHOD OF AND APPARATUS FOR PRODUCING AND PROCESSING FROZEN CONFECTIONS

TECHNICAL FIELD

This invention relates to a method or process of and apparatus for producing frozen confections and more especially to frozen confections of the character wherein a body of ice cream, ice milk, or other freezable edible is disposed between two cookies or wafers providing a confection usually referred to as an ice cream sandwich.

BACKGROUND ART

It is well known to produce so-called ice cream sandwiches by placing a section or center of ice cream between two cookies or the like. It is also known to make a so-called ice cream sandwich comprising an ice cream center between two cookies wherein bits or pieces of chocolate are manually applied by an operator into the ice cream center.

DISCLOSURE OF THE INVENTION

The present invention relates to a method of and apparatus for automatically delivering, impinging or impressing bits or pieces of edible material, such as bits or pieces of chocolate, chopped nuts or bits and pieces of other edible solids onto the periphery of a body of soft ice cream, ice milk, freezable pudding or the like, severing a section of the body of soft ice cream bearing the bits or pieces of edible solids and disposing the severed body between two cookies in producing a so-called ice cream sandwich.

After assembly of the cookies with the sections of soft ice cream bearing bits or pieces of an edible solid, the composite products of cookies and ice cream are subjected to refrigeration or reduced temperature to solidify the ice cream. The invention embraces a method of and apparatus for agitating the bits or pieces of the edible solid as the bits or pieces are moved along a column of soft ice cream to prevent "bridging" of the bits or pieces of edible solid and provide substantially uniform disposition of the bits or pieces of edible solid about the column of ice cream.

The method and apparatus of the invention include an adjustable gating means or valve for controlling the delivery of bits or pieces of edible solid to the moving column of soft ice cream to thereby regulate the amount of pieces or bits of edible solids assembled with the column of ice cream.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings.

BRIEF DESCRIPTION OF THE DRAWINGS

The details of the invention will be described in connection with the accompanying drawings in which:

FIG. 1 is a semischematic side elevational view of an apparatus for making ice cream sandwiches or the like illustrating a form of apparatus for processing the ice cream components of the ice cream sandwiches;

FIG. 1A is a fragmentary sectional view taken substantially on the line 1A—1A of FIG. 1;

FIG. 2 is an enlarged vertical sectional view illustrating a form of apparatus for forming the edible component of ice cream and solid edible material of the ice cream sandwich;

BEST MODE FOR CARRYING OUT THE INVENTION

Figure 3:
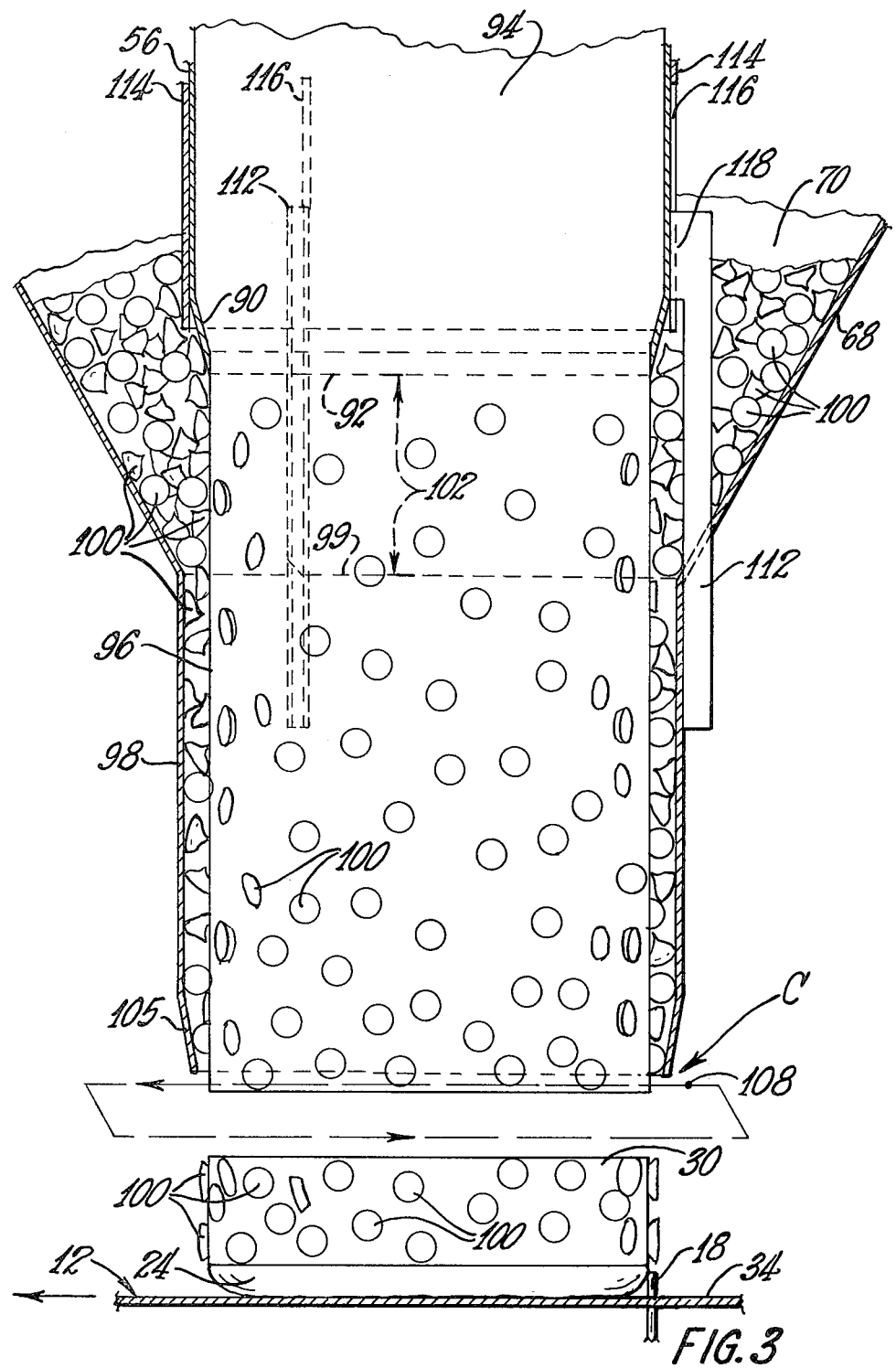
FIG. 3 is an enlarged vertical sectional view of a portion of the apparatus for agitating and applying bits or pieces of edible solid to a column of soft ice cream for forming the ice cream components of sandwiches.

Referring to the drawings and initially to FIG. 1 there is semischematically illustrated a conveyor system for assembling cookies at opposite sides of an ice cream section, disc or center for producing a so-called ice cream sandwich. This is also illustrated apparatus for forming and processing a supply column of soft ice cream with bits or pieces of chocolate or other edible solid impressed in the periphery of the column of ice cream, delivering a severed section of the processed column of ice cream onto a cooky, and a second cooky placed on the ice cream section.

The apparatus illustrated in FIG. 1 comprises a frame structure (not shown) upon which is mounted an endless belt-type conveyor system 10 and a track system 12 for supporting and guiding the components of the ice cream sandwiches. The conveyor system 10 comprises an endless belt 14 mounted on sprockets 16 journaled on a suitable support means (not shown) one of the sprockets being driven by a conventional motor or motive means (not shown) controlled to preferably provide a periodically interrupted or step-by-step movement of the conveyor belt 14.

The conveyor belt 14 may be of a conventional type comprising metal links articulately joined together. The conveyor belt 14 is provided with spaced projections or pins 18, the pins 18 of the upper flight of the conveyor extending upwardly and the pins 18 of the lower flight extending downwardly.

The track system 12 is provided for supporting the cooky components and the ice cream components or sections as these components are assembled into ice cream sandwiches. The lowermost cookies 24 for the ice cream sandwiches are provided from a cooky supply 26 supported in a channel-shaped member 28 at a cooky supply station "B". The ice cream and chocolate bit feed and control station is indicated at "C" and a supply of the uppermost cookies for assembly into ice cream sandwiches is indicated at station "D".

The track system 12 for supporting the cookies and assembled ice cream sandwiches is inclusive of a central track or support 34 and supplemental or auxiliary tracks or supports 36 and 38 at the sides of the central track 34 shown in FIG. 1A. As shown in FIG. 1A the auxiliary tracks 36 and 38 are spaced laterally from the central track 34 providing lengthwise arranged slots or spaces 40 to accommodate movements of the pins or projections 18 of the endless belt-type conveyor construction 10.

The tracks 34, 36 and 38 are supported by a frame structure including transversely extending members or bars 42 and 44 or other suitable support means. The support members 42 and 44 maintain the tracks in proper spaced position to provide for movement of the pins 18 in the slots or spaces 40.

The pins 18 of the upper flight moving between station "B" through station "C" move in a substantially horizontal direction. The conveyor system 10 is driven whereby the upper flight 20 moves in a left-had direction as viewed in FIG. 1. The pins or projections 18 of the upper flight extend slightly above the upper plane of the right-hand portions of the tracks 34, 36 and 38 whereby the pins engage and remove the lowermost cooky 24 from the supply of cookies 26 and propel the cookies horizontally in a left-hand direction as viewed in FIG. 1 while supported by the track system 12.

The cookies are moved successively in a substantially horizontal direction through station "C" at which a disc, center or section 30 of processed ice cream is deposited on a cooky 24. The track system 12 slants downwardly at the left side of station "C" to an extent whereby the upper end regions of the pins 18 remove a lowermost cooky 31 from a supply 32 mounted in a channel-shaped member 28a at station "D" and a removed cooky 31 deposited upon the ice cream disc, center or section 30 at station "D" to complete an assembled ice cream sandwich 33.

The track system at the left of station "D" is slanted upwardly and elevated to substantially the height of the track system at the right side of station "C". Disposed at the lefthand end of the conveyor belt system 10 is a rotatable shaft 48 mounting a disc or wheel 50 provided with radially projecting vanes or arms 52 shown in FIG. 1.

The shaft 48 is rotated in synchronism with the movements of the conveyor belt system 10 whereby the radial arms or vanes 52 successively engage and remove the ice cream sandwiches 33 from the track system 12 onto a conveyor (not shown) which conveys the ice cream sandwiches through a chamber at reduced temperatures to solidify or freeze the ice cream discs, centers or sections of the ice cream sandwiches.

At the region to the left of the deposit of a cooky at station "D" onto a disc, center or section 31 of ice cream, the track system is elevated so that the vanes or arms 52 engage and remove the completely assembled ice cream sandwiches from the track system.

The invention is inclusive of a method of and apparatus for processing soft or viscous freezable confection such as ice cream, ice milk or other dairy composition including an arrangement for impressing or forcing particulate edible material such as bits or pieces of chocolate or other edible into the periphery of a column of soft freezable confection or soft ice cream and severing sections or discs of the processed column of soft ice cream for inclusion between cookies in the formation of ice cream sandwiches. One form of apparatus for processing the ice cream and applying bits or pieces of edible solid or particulate material to a column or elongated body of soft ice cream is shown in FIGS. 1, 2 and 3.

With particular reference to FIG. 2, the apparatus includes a vertically disposed thin-walled tubular means, tube or member 56 which is closed at its upper end by a cap or cover 58. A soft ice cream is fed into the tube 56 through a tube 60 which is connected with a supply of soft ice cream under comparatively low pressure so that the soft ice cream may be fed downwardly through the tube 56.

A support plate 62 is welded or secured to the wall of tube 56 and support means or members 64 forming part of a support structure are secured to the substantially horizontal frame plate or member 62. The support plate or member 62 is welded or otherwise secured to the exterior wall of the vertical tube 56.

The invention is inclusive of an apparatus and means for delivering bits or pieces of solid chocolate or other edible solid or particulate material to be assembled or impressed into the periphery of a column of ice cream delivered from the lower end of the tube 56. In the embodiment illustrated in FIGS. 1 and 2 a cone-shaped or funnel-shaped member 68 surrounds the tube 56 and forms a chamber 70 in which a quantity of chocolate bits or pieces is maintained about the exterior of the tube 56. The member 68 is provided with a horizontal cover member 72 having its edges secured to the upper perimeter of the cone-shaped or funnel-shaped member 68.

The center region of the cover member 72 is provided with an opening through which extends the tube 56 providing a small clearance between the cover member and the tube 56 whereby the member 68 and cover member 72 may be vibrated or agitated relative to the tube 56. Welded or otherwise secured to the exterior of the tube 56 adjacent the cover member 72 is a plurality of clips or L-shaped brackets 74, there being preferably three brackets, two of which are illustrated in FIG. 2.

The horizontal legs of the brackets 74 engage and support the cover plate 72 and the cone or funnel-shaped member 68, the opening in the cover 72 being slightly larger than the transverse dimension or outside diameter of the tube 56 to accommodate vibration of the cover member 72 and the cone or funnel-shaped member 68 independently of the tube 56. A conventional type of electrically operated vibrator 78 is connected with the funnel-shaped member 68 and provides a vibrating means for vibrating or agitating the member 68 and the cover 72 at a comparatively high frequency.

Supported above the funnel-shaped member 68 is a container 82 in which is maintained a supply of bits or pieces of solid chocolate or other edible solid. Disposed beneath the container 82 and connected therewith are two funnel-shaped members 84 and connected with the lower ends of the funnel-shaped members 84 are tubes 86 of flexible plastic or other flexible material, the lower ends of the tubes 86 being connected with tubular inlets 88 forming a part of the cover member 72.

The bits or pieces of edible solid material flow downwardly from the container 82 through the funnel-shaped members 84, through flexible tubes 86 and the tubular inlets 88 into the chamber 70 provided by the cone or funnel-shaped member 68.

The tube 56 is preferably circular in cross section for producing a circular column of soft ice cream but it is to be understood that the tube 56 and other components of the apparatus hereinafter mentioned may be of square or polygonal configuration if a different shape for the section of ice cream in a sandwich is desired.

Assuming that the section, disc or body 30 of ice cream is of circular configuration, the tube 56 would be of circular cross section. While it is preferred that the tube 56, member 68 and the cover member 72 be made of metal such as stainless steel, these components may be made of a suitable plastic or resinous material.

The lower end region of the tube 56 is provided with an inwardly tapered restriction 90. The restriction terminating at the broken line 92 shown in FIG. 3. The soft ice cream is moved downwardly in the tube 56 in the form of a column 94 shown in FIGS. 2 and 3. The restriction 90 guides or compresses the column 94 of ice cream to a column 96 of ice cream of lesser diameter or transverse dimension.

The funnel-shaped member 68 is fashioned at its lower end of least dimension with a generally circular cylindrical extension, sleeve or sleeve portion 98, the portion 98 being joined with the funnel-shaped member 68 along the line 99. The extension or sleeve portion 98 is of an interior diameter larger than the diameter of the column 96 of soft ice cream so as to provide space for bits or pieces of solid chocolate 100 or other edible solid to engage the peripheral region of the column 96 of ice cream.

The juncture line 99 of the funnel-shaped member 68 with the downwardly extending extension 98 is spaced from the lower terminal 92 of the tubular member 56 providing a gap or space 102 defined between the lines 92 and 99 to promote intimate contact of the bits or pieces of chocolate 100 in the chamber 70 provided by the funnel-shaped member 68 with the soft ice cream of the column 96.

The vibration or agitation of the funnel-shaped member 68 and its extension 98 under the influence of the vibrating means 78 causes vibration or agitation of the bits or pieces of chocolate 100 in the funnel-shaped member 68 to promote uniformity of the bits or pieces of chocolate at the surface region of the column 96 of ice cream and prevents "bridging" of the bits and pieces of chocolate in the chamber 70.

As shown in FIGS. 2 and 3, the lower end region 105 is slanted or tapered inwardly providing a restriction which forces or impresses the bits and pieces of chocolate or other edible solid into the peripheral region of the column 96 of soft ice cream so that the bits or pieces of chocolate are pressed into the ice cream so that they will not become dislodged from the ice cream during further processing.

The terminus of the inwardly slanted portion 105 of the extension or member 98 is spaced slightly from the column 96 of ice cream so that upon severing of a section of the column of ice cream bearing bits and pieces of chocolate from the column 96, the bits and pieces of chocolate 100 extend slightly outwardly from the periphery of the ice cream section 30 as shown in FIG. 3.

Means is provided for severing or separating sections or disc-like bodies from the column 96 of ice cream, ice milk or the like bearing the bits and pieces of chocolate. The columns 94 and 96 of soft ice cream are under substantially constant low pressure causing extrusion of the ice cream or ice milk provided with the bits or pieces of chocolate from the lower open end of the extension 105 of member 98.

In the embodiment illustrated, the severing means includes an electrically energized resistance wire 108 supported by means (not shown) arranged to move the wire horizontally across the exit of the extension 105 of member 98, the wire moving in the directions indicated by the arrows in FIGS. 1, 2 and 3. The wire is electrically energized to a red heat or a temperature sufficiently high to sever sections or disc-like bodies 30 from the column 96 of ice cream and bits or pieces of chocolate embedded therein.

A section or body 30 is severed by movement of the hot wire 108 in a left-hand direction as viewed in FIGS. 2 and 3. The hot wire or severing device 108 during its return movement as indicated by the arrows in FIGS. 2 and 3 traverses a path above the severed body 30 to the initial position of the wire 108 shown in FIGS. 2 and 3.

The movements of the hot wire 108 are timed so that when a cooky 24 on the conveyor system 12 is in vertical alignment with the column 96 of ice cream and pieces of chocolate, the wire will be moved to sever a section of the column 96 of ice cream which falls onto the cooky 24 beneath the column 96 of ice cream.

Means is provided for controlling or regulating the delivery of bits and pieces of chocolate or other edible solid from chamber 70 of the funnel-shaped member 68 into contact with the column 96 of soft ice cream. Referring to FIGS. 2 and 3, there are three supports or guide members 112 preferably equally spaced about the periphery of the member or extension 98 of the funnel-shaped member 68.

The lower regions of the guide members 112 extend through openings in the funnel-shaped member 68 and are secured by any suitable means to the extension 98. The guide members 112 are preferably of U-shaped cross section and extend through openings in the funnel-shaped members 68 at the region of the juncture of the funnel-shaped member 68 with the extension member 98.

Surrounding the tubular member 56 is a sleeve or valve member 114 which is readily slidable vertically relative to the tubular member 56. The sleeve or valve member 114 is provided with three openings or vertical slots 116, each of the slots accommodating an inwardly extending portion 118 of a side wall of each of the members 112, the inwardly extending portion 118 of each of the members 112 being slidable in one of the slots 116 in the control means or sleeve 114.

In this manner the slots 116 in the valve or control member 114 have sufficient clearance so that the member 114 is slidable along the inwardly extending portion 118 of each of the guide members 112. There is sufficient clearance between the inwardly extending portions 118 of the supports 112 so that the supports vibrate with the funnel-shaped member 68 without transfer of the vibrations to the sleeve or valve member 114 or the tubular member 56.

Means is provided for regulating or adjusting the position of the sleeve or valve member 114. Referring to FIG. 2 it will be noted that the upper end of the sleeve or valve member is provided with a laterally extending flange 122 provided with an opening accommodating a vertically disposed rod 124. The rod 124 at the region adjacent the flange 122 is threaded to accommodate adjusting nuts 126 for securing the rod to the flange 122.

The upper end of the rod 124 is provided with a handle portion 128 for manipulating or adjusting the relative position of the sleeve or valve member 114. Thus, as viewed in FIG. 3, the sleeve or valve member 114 may be slidably moved downwardly whereby the sleeve or valve 114 partially closes the gap 102 between the lower end of the inwardly inclined portion 90 of the tube 56 and the line 99 being the juncture of the extension 98 with the funnel-shaped member 68.

In this manner the gap 102 may be regulated to control the flow of bits and pieces of chocolate into contact with the column 96 of soft ice cream to thereby regulate the amount of bits and pieces of chocolate impressed in the ice cream of the column 96 and in the sections 30 severed from the column 96 of ice cream and bits and pieces of chocolate impressed therein. There is sufficient friction between the surfaces of the valve or sleeve member 114 and the tubular member 56 to frictionally retain the member 114 in any adjusted position.

The operation of the apparatus in carrying out the method is as follows: A motor (not shown) for advancing the conveyor 10 is energized, the control means for the motor causing the motor to move the conveyor through successive positions. The pins 18 of the conveyor system successively engage cookies 24 from the supply 26 and convey the cookies in a left-hand direction as viewed in FIG. 1.

As a cooky 24 is moved into the position in vertical alignment with the ice cream and chocolate bit delivery tube or extension 98 the pressure on the column of soft ice cream forces the ice cream and bits of chocolate past the restriction 105, the restriction forcing or impressing the bits or pieces of chocolate into the peripheral regions of the column 96 of soft ice cream.

The pressure on the soft ice cream is regulated so that when the column of ice cream provided with the bits and pieces of chocolate extends sufficiently below the restriction 105, the electrically energized hot wire 108 is moved in a lefthand direction, as viewed in FIGS. 2 and 3, to sever a section 30 from the column 96 of ice cream, the section falling by gravity upon a cooky 24.

The conveyor 10 conveys the cooky 24 and the section 30 of ice cream and chocolate bits thereon to a position beneath the supply 32 of cookies 31. The upwardly extending pins 18 adjacent the supply 32 of cookies engaging the lowermost cooky 31 withdraw it from the supply, the cooky 31 being deposited on the ice cream section 30 thus forming a sandwich 33 with an ice cream center, disc or section.

The conveyor advances the completed ice cream sandwiches to the region of vanes 52 of the wheel 50 which vanes engage and remove the ice cream sandwiches from the track system 12 and deliver them onto a conveyor (not shown) which conveys the ice cream sandwiches into a reduced temperature or subfreezing environment for freezing the ice cream and freezing the ice cream to the cookies of a sandwich.

Bits and pieces of chocolate or other edible solid, such as chopped nuts, candy fragments or the like, contained in the supply receptacle 82 flow downwardly through the flexible tubes 86 into the chamber 70 provided by the funnel-shaped member 68.

The vibrator 78 continues to vibrate or agitate the funnel-shaped member 68, the cover 72 and the extension 98 to continuously agitate or vibrate the bits and pieces of chocolate 100 or edible solid contained in the chamber 70. The vibration or agitation of the bits and pieces of chocolate prevents "bridging" of the bits or pieces in the chamber 70 and promotes more uniform distribution of the bits and pieces along the column 96 of soft ice cream.

The valve or sleeve member 114 may be adjusted vertically by manipulation of the handle 128 to control the width of the annular space or gap 102 and thereby control or regulate the amount or rate of flow of bits and pieces of chocolate or other edible solid admitted into contact with the column 96 of soft ice cream.

The column 96 of ice cream and bits and pieces of chocolate 100 adhering to the column of ice cream are forced downwardly by low pressure on the ice cream supply admitted into the tubular member 56 through the entrance tube 60.

The column 96 of ice cream and bits and pieces of chocolate around the peripheral surface of the column 96 move through the restriction 105 at the lower terminus of the extension or member 98. The bits and pieces of chocolate 100 are forced or impressed into the peripheral region of the column 96 of ice cream so that the bits and pieces of chocolate are embedded in the ice cream.

Thus when the severing device or hot wire 108 is actuated to sever a section or disc-like body 30 of ice cream and bits and pieces of chocolate from the column 96, the bits and pieces of chocolate are substantially embedded in the soft ice cream of the section 30 as illustrated in FIG. 3.

As a means of impressing bits or pieces of chocolate or other edible solid into the column of soft ice cream other than under the influence of the restriction 105, the member or extension 98 may be tapered slightly inwardly and downwardly throughout its length to its lower terminus and in this manner the bits and pieces of chocolate may be progressively forced or impressed into the column of ice cream throughout substantially the length of the extension or member 98.

Figure 4:
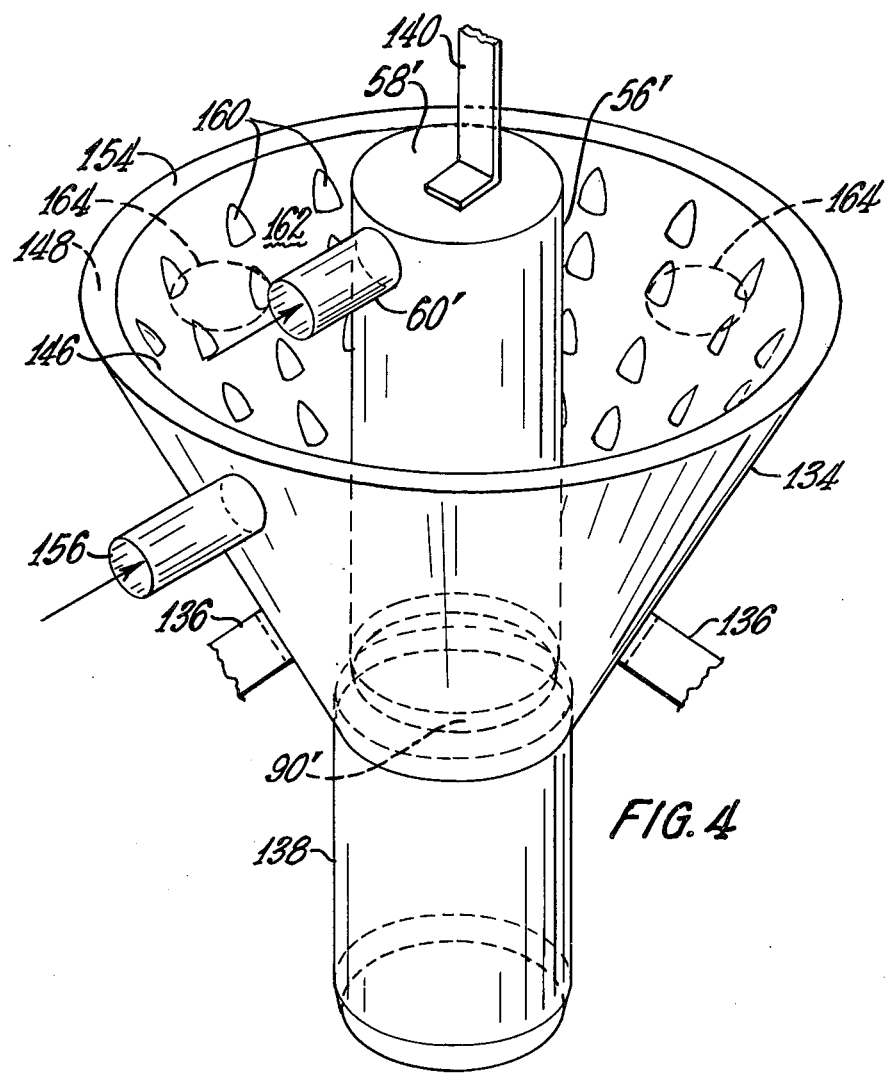
FIG. 4 is an isometric view of another form of apparatus for agitating and delivering bits and pieces of an edible solid to a column of soft ice cream.
Figure 5:
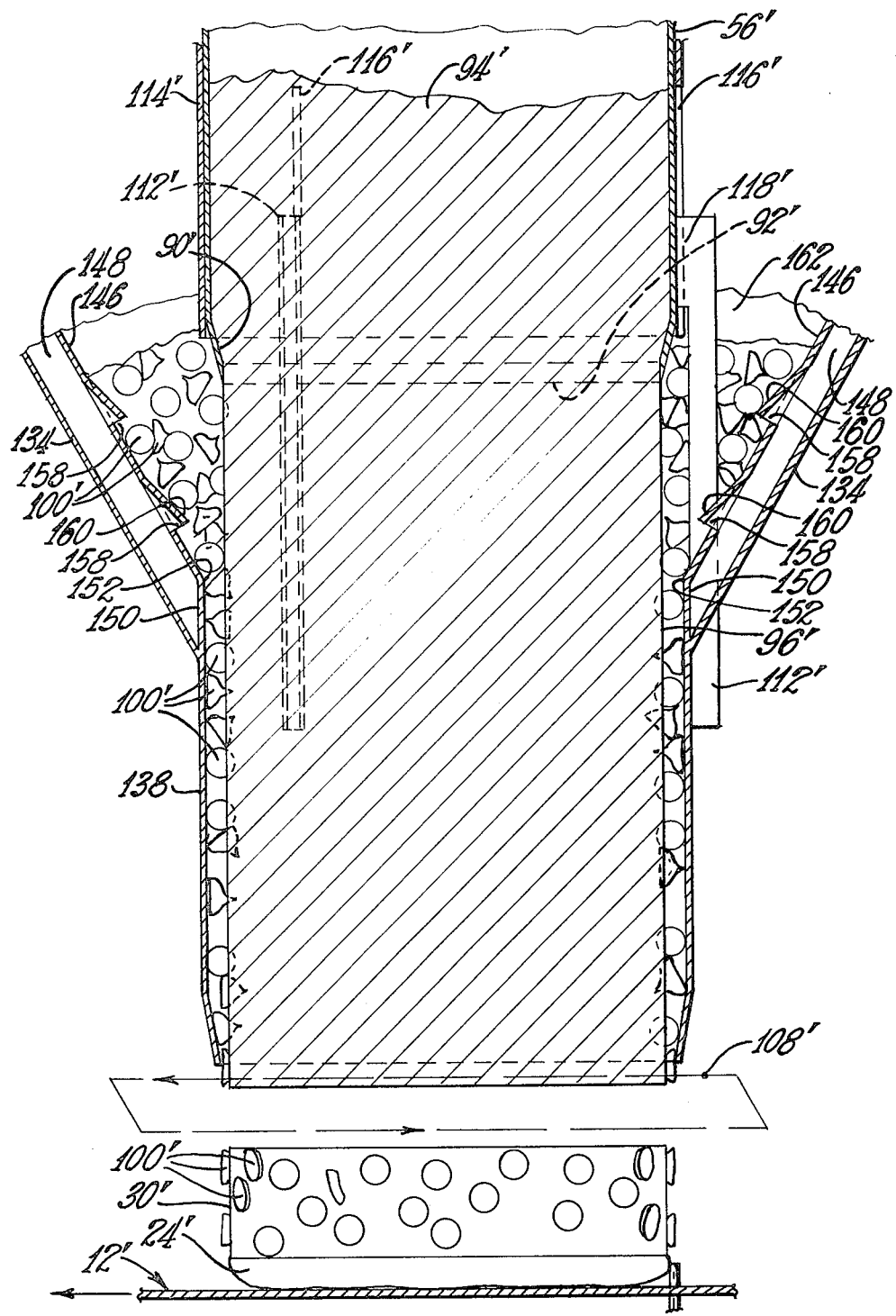
FIG. 5 is an enlarged vertical sectional view of a portion of the apparatus shown in FIG. 4.

FIGS. 4 and 5 disclose a modified arrangement for agitating or vibrating the bits or pieces of chocolate or other edible solid contained in a funnel-shaped chamber. A member 134 is of a shape similar to the funnel-shaped member 68. The funnel-shaped member 134 is supported by structural members 136 or other support means and is provided at its lower end with a circular cylindrical extension or sleeve 138 which is similar to the extension 98 hereinbefore described.

Mounted centrally of the funnel-shaped member 134 is a tube 56' provided with a cover 58', the upper end of the tube being provided with a pipe 60' through which soft ice cream from a supply is introduced into the tube 56'. The tube 56' is supported by a structural member 140 secured to the cover 58' of the tube 56' or may be supported by other structural means.

The soft ice cream delivered under comparatively low pressure through the tube 60' into the tube 56' provides a column 94' of ice cream. The lower end of the tube 56' is provided with an inwardly extending restriction 90' terminating at the broken line 92'. The restriction 90' guides or compresses the column 94' of soft ice cream to a column 96' of ice cream of lesser diameter or transverse dimension.

The extension or sleeve portion 138 is of an interior diameter larger than the diameter of the column 96' of soft ice cream so as to provide an annular space for bits or pieces of solid chocolate 100' to engage the peripheral region of the column 96' of soft ice cream.

The arrangement illustrated in FIGS. 4 and 5 provides multiple air streams for agitating or vibrating the bits and pieces of chocolate 100' contained within a funnel-shaped member 146 which is disposed in and spaced from the outer funnel-shaped member 134 providing an air chamber 148. An upper portion 150 of the extension 138 engages the lower end of the inner funnel-shaped member 146 at a juncture 152, the portion 150 closing the lower end of the chamber 148.

An annularly-shaped cover 154 engaging the upper edges of the funnel-shaped members 134 and 146 closes the upper end of the chamber 148. A tubular member 156 joined with a wall of the outer funnel-shaped member 134 is connected with an air blower or other source of low air pressure whereby air is delivered into the chamber 148. If desired, more than one air tube 156 may be utilized for supplying air under pressure to the chamber 148.

Formed on the wall of the inner funnel-shaped member 146 is a plurality of openings 158, each opening being provided with a louver 160. The louvers 160 face downwardly as shown in FIG. 5 whereby streams of air from the chamber 148 through the openings 158 agitate or vibrate the bits and pieces of chocolate 100' contained in the chamber 162. The chamber 162 defined between the tube 56' and the inner funnel-shaped member 146 receives bits and pieces of chocolate from a supply through inlets 164 shown in broken lines in FIG. 4.

Means is provided for controlling or regulating the delivery of bits and pieces of chocolate or other edible solid from the chamber 162 into contact with the column 96' of soft ice cream. Referring to FIG. 5 there are three supports or guide members 112' preferably equally spaced about the periphery of the member or extension 138 and are secured to the member 138. The guide members 112' extend upwardly through the openings in the funnel-shaped members 134 and 146. The guide members 112' are preferably of U-shaped cross section.

Surrounding the tubular member 56' is a sleeve or valve member 114' which is longitudinally slidable relative to the tubular member 56'. The sleeve or valve member 114' is provided with three openings or vertical slots 116', each of the slots accommodating an inwardly extending portion 118' of a side wall of each of the members 112'. Each of the inwardly extending portions 118' is slidable in one of the slots 116'. The sleeve or valve member 114' may be adjusted through manipulation of a control rod 124 shown in FIG. 2.

Thus by adjusting the relative position of the slidable sleeve or valve member 114' downwardly along the tube 56', the sleeve partially closes the gap or space between the lower end of the inclined portion 90' of the tube 56' and the juncture 152 of the sleeve portion 150 with the inner funnel-shaped member 146 to thereby regulate or control the flow of bits or pieces of chocolate into contact with the periphery of the column 96' of soft ice cream. There is sufficient friction between the surfaces of the valve or sleeve member 114' and the tubular member 56' to frictionally retain the member 114' in an adjusted position.

The arrangement shown in FIGS. 4 and 5 may be utilized in the system shown in FIGS. 1, 1A, 2 and 3. An electrically heated wire 108' is utilized for severing sections 30' having bits or pieces of chocolate 100' embedded in the periphery thereof severed from the column 96' of soft ice cream as disclosed in FIGS. 1 and 2. Each section is deposited upon a cooky 24' being conveyed along the track system 12'.

In the arrangement shown in FIGS. 4 and 5 the bits or pieces of chocolate 100' or other edible solid are fed from a supply into the chamber 162 and air under comparatively low pressure is fed through the tube 156 into the annular air chamber 148. The air in the annular chamber 148 flows through the louvered openings 158, the air being directed generally downwardly by the louvers 160.

The several streams of air delivered through the louvered openings agitate or vibrate the bits or pieces of chocolate 100' or other edible solid in the chamber 162 to promote uniform distribution of the bits or pieces along the column 96' of ice cream as well as to eliminate "bridging" of the bits or pieces in the chamber 162.

The sections 30' of ice cream on the track system 12' are conveyed to station "D" illustrated in FIG. 1 wherein a second cooky is deposited upon each of the ice cream sections 30' to complete ice cream sandwiches which are delivered from the track system 12' to a conveyor (not shown) for conveying the assembled ice cream sandwiches into a freezing compartment or reduced temperature environment for freezing the ice cream components 30' of the sandwiches.

Figure 6:
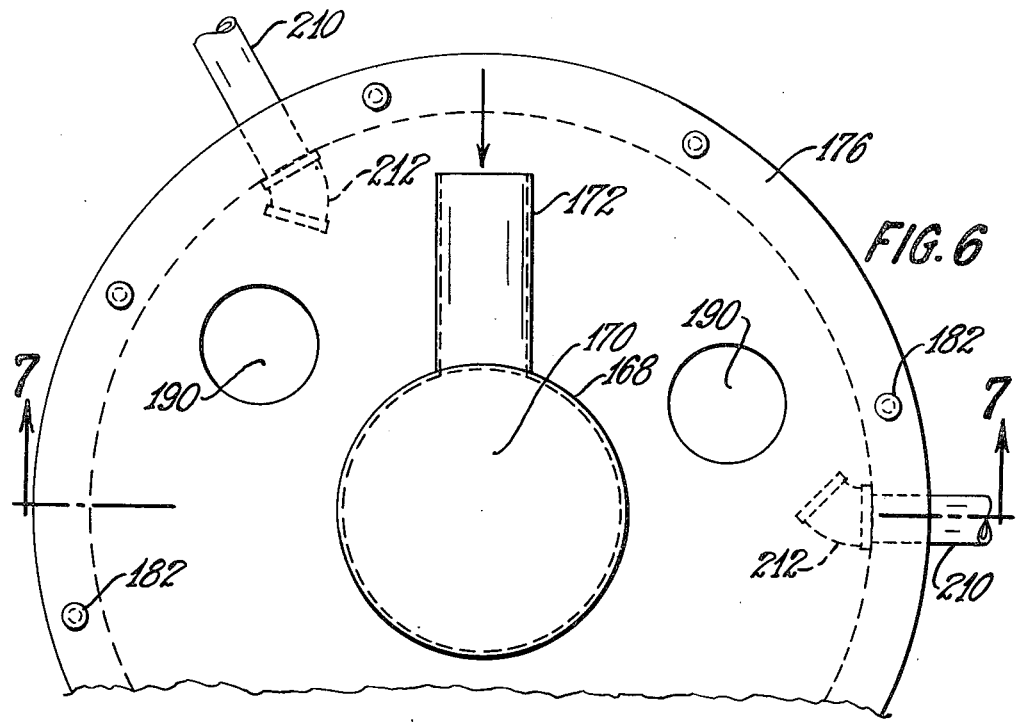
FIG. 6 is a partial top plan view of a modified arrangement for agitating the pieces or bits of edible solid material for assembly with a column of soft ice cream.
Figure 7:
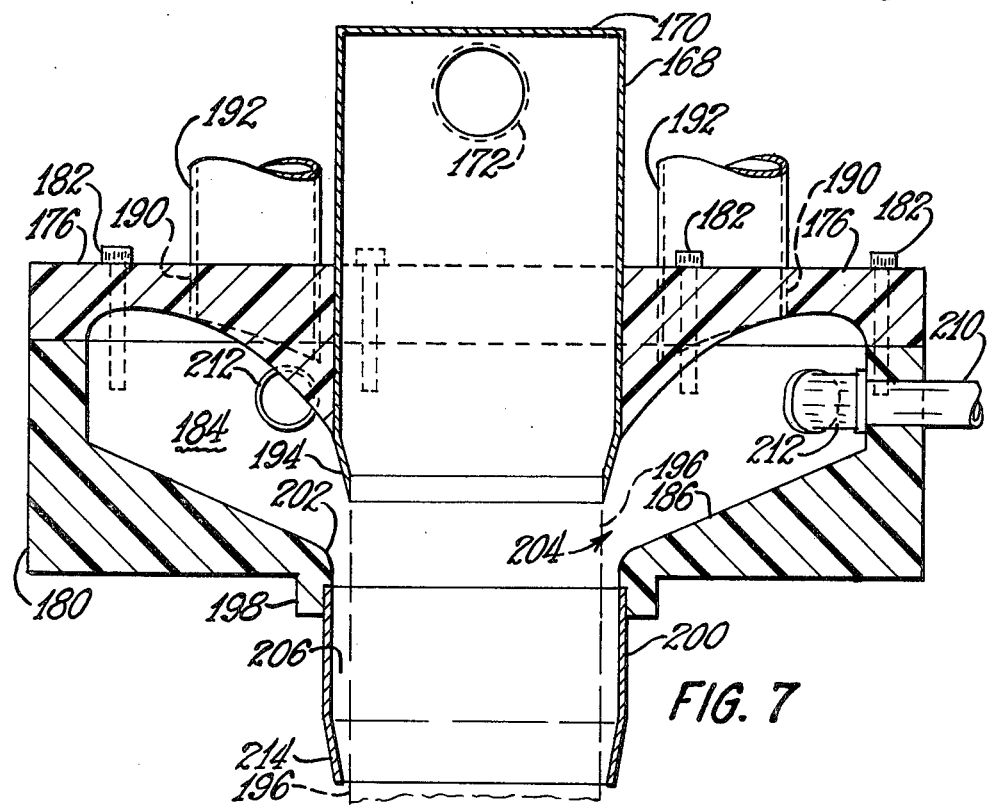
FIG. 7 is a sectional view of the arrangement illustrated in FIG. 6, the section being taken substantially on the line 7—7 of FIG. 6.

FIGS. 6 and 7 disclose a modified arrangement for utilizing air streams for agitating or vibrating bits or pieces of chocolate or other edible solid or particulate material for assembly into the peripheral surface region of a column of soft ice cream. The arrangement includes a tubular member 168 having an upper cover 170. A tubular member 172 connects the upper end of the tubular member 168 with a supply of soft ice cream under low pressure which is fed into the tubular member 168 through the tube 172.

Surrounding the tube 168 is a body member 176 preferably of molded plastic material which is supported by suitable frame structure (not shown). Positioned immediately below the plastic body 176 is a second body member 180 preferably of plastic material. The first plastic body 176 is securely fastened to the tubular member 168. The body member 180 is removably secured to the first body 176 by means of screws 182 or other securing means.

The body members 176 and 180 are fashioned to provide an interior chamber 184. The lower wall 186 defining the chamber 184 is of conical shape. The body member 176 is provided with inlet openings 190, the inlets 190 being connected by tubular members 192 with a container such as container 82 shown in FIG. 1 containing a supply of bits and pieces of chocolate or other edible solid or particulate material. The bits and pieces of chocolate or other edible solid are fed into the chamber 184.

The lower region 194 of the tubular member 168 is slanted inwardly as shown in FIG. 7 to form a column 196 of soft ice cream of lesser diameter than that of the column of ice cream in the tubular member 168.

The body member or portion 180 has a downwardly extending annular portion 198 having an inner circular recess to receive and accommodate the upper end of a cylindrically-shaped sleeve or member 200. The inner surface of the member 200 is of slightly greater diameter than that of the column 196 of ice cream. The terminus 202 of the wall 186 coincides with the inner surface of the sleeve or member 200 as shown in FIG. 7.

The terminus of the restriction 194 is spaced from the terminus 202 of the wall 186 providing a circular gap or space 204 through which bits or pieces of chocolate or other edible solid or particulate material in the chamber 184 move into the annular space 206 defined between the inner surface of the member 200 and the exterior surface of the column 196 of soft ice cream.

Air streams under comparatively low pressure are delivered into the chamber 184 for agitating or vibrating the bits or pieces of chocolate or other edible solid. The air is delivered from a pressure source through tubes 210, two of which are shown in FIGS. 6 and 7 but a third tube is preferably utilized to admit air into three spaced zones. Each of the tubes 210 is preferably provided with a 45° ell 212 to direct the air streams in generally circular paths through the chamber 184.

The air streams agitate or vibrate the bits or pieces of chocolate or other edible particulate material in the chamber 184 and promote more uniform distribution of the bits or pieces into contact with the column 196 of soft ice cream and also tend to prevent "bridging" of the bits or pieces of chocolate or other edible solid in the chamber 184.

The lower end region of the sleeve or member 200 is formed with an inwardly slanted portion 214 whereby the bits or pieces are engaged with the restriction 214 forcing or impressing the bits and pieces or particulate material into the peripheral region of the column 196 of ice cream as it moves through the restriction 214.

A section of the soft ice cream column 196 with the bits and pieces impressed or embedded in the peripheral region is severed by means of an electrically heated wire from the column 196 of soft ice cream in the manner illustrated in FIGS. 1, 2 and 3. While the body members 176 and 180 are shown of molded plastic or the like, it is to be understood that these components may be fashioned of metal if desired.

The operation of the arrangement shown in FIGS. 6 and 7 is as follows: Soft ice cream under low pressure is forced through the inlet tube 172 into the tube 168 and moves downwardly through the tube. Bits or pieces of chocolate or other edible solid or particulate material are flowed into the chamber 184 from a supply through the tubular means 192. Air under comparatively low pressure flows through the tubes 210 and the ells 212 into the chamber 184, the air streams agitating or vibrating the bits or pieces of chocolate or other edible solid in the chamber 184.

The downwardly moving column of soft ice cream in the tube 168 is partially restricted by the restriction 194 whereby the column 196 of ice cream is forced through the restriction downwardly through the member 200, the column of soft ice cream 196 being of lesser diameter than the interior diameter of member 200 providing an annular space 206 into which the bits or pieces of chocolate are fed through the circular gap or space 204 along the column 196 of ice cream.

As the column 196 of soft ice cream and the bits and pieces of chocolate move through the restriction 214 they are forced or impressed into the peripheral regions of the column 196 of soft ice cream. Sections of the soft ice cream provided with bits or pieces of chocolate are severed from the column 196 of soft ice cream and are assembled with cookies in the manner illustrated in FIG. 1 forming ice cream sandwiches which are advanced by a conveyor into a zone of reduced temperature for freezing the ice cream sections in the ice cream sandwiches.

Figure 8:
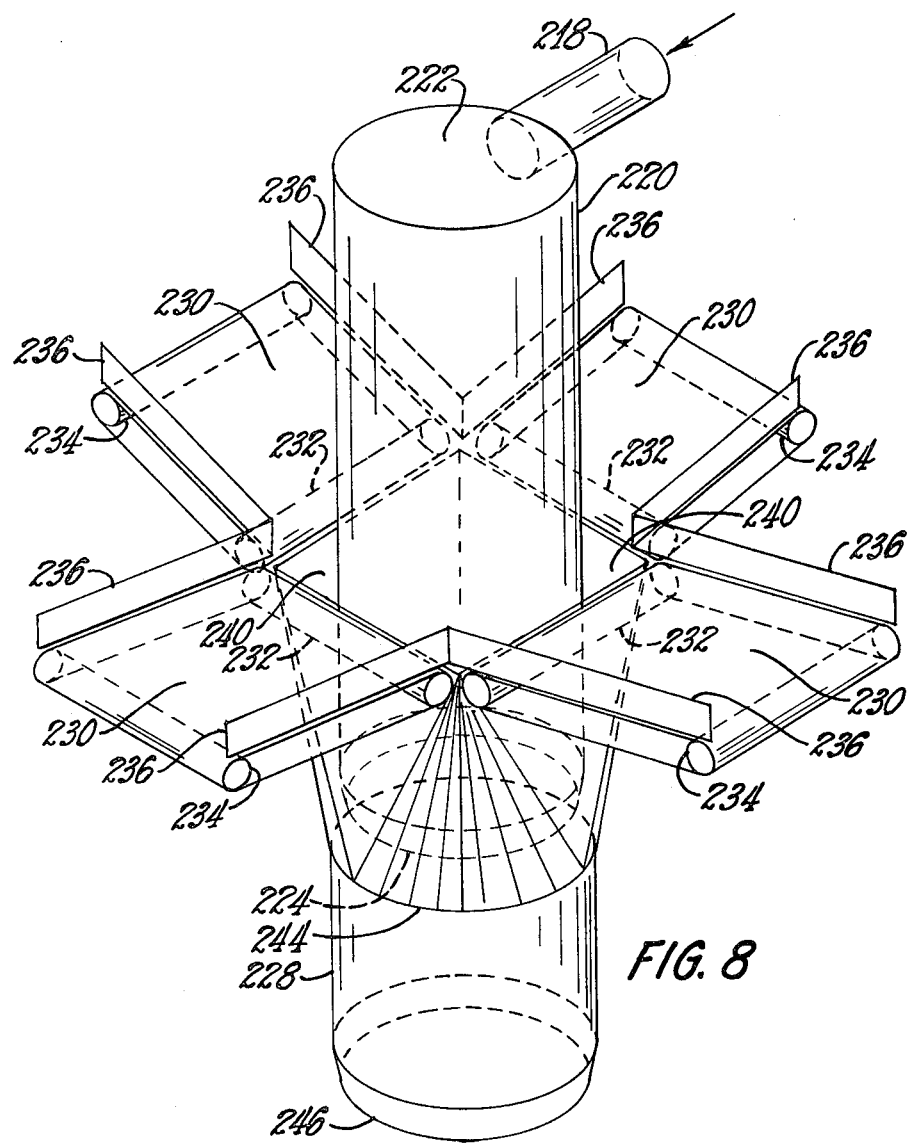
FIG. 8 is an isometric view illustrating a modified arrangement for delivering bits or pieces of an edible solid along a column of soft ice cream.

A modified arrangement for feeding bits and pieces of chocolate or other edible solid to the peripheral regions of a column of ice cream is illustrated in FIG. 8. In this arrangement the soft ice cream is fed from a supply through an inlet tube 218 under comparatively low pressure into a vertically disposed tubular member 220 having its upper end closed by a cover 222.

The column of soft ice cream in the tube 218 is forced through a restriction 224 whereby the column of soft ice cream below the restriction 224 flows through a cylindrically shaped member 228, the diameter of the column of ice cream in the member 228 being less than the interior diameter of the circular cylindrical member 228 providing an annular space for the bits or pieces of chocolate or other edible solid to engage and contact the column of ice cream as it moves through the member 228.

The arrangement shown in FIG. 8 embodies conveyor means for advancing or feeding bits or pieces of chocolate or other edible solid or particulate material to the column of ice cream in the cylindrical member 228. In the embodiment shown in FIG. 8 a plurality of movable feed belts or conveyors are spaced about the tube 220, there being four belts illustrated in FIG. 8, the belts being identified by numeral 230. Each of the belts 230 is supported upon an innermost roll 232 and an outermost roll 234.

The upper flight of each of the belts 230 moves between a pair of guides or rails 236. The upper flights of the belts 230 receive bits or pieces of chocolate or other edible solid between each pair of guide members 236 from a supply (not shown). Each of the outer rolls 234 is driven in a direction at a slow rate of speed by motive means (not shown) whereby the belts convey the bits or pieces of chocolate toward the tubular member 220.

The upper flight of each of the belts 230 feeds the bits or pieces of chocolate to a chamber 240 which, at the region of the innermost rolls 232 of the conveyors, is of square configuration. The wall portions of the square configuration adjacent the rolls 232 are tapered downwardly and inwardly and at the region 244 are joined with the circular cylindrical sleeve, extension or member 228.

The bits and pieces of chocolate conveyed by the conveyors 230 into the interior of the chamber 240 flow downwardly along the walls defining the chamber 240 into the annular space between the tube of ice cream below the restriction 224 and the interior circular surface of the sleeve or member 228.

The pieces or bits of chocolate fed from a supply onto the conveyor belts 230 may be agitated or vibrated by vibrating the belts 230 as the bits and pieces are conveyed by the belts into the chamber 240. The assembly of ice cream and bits and pieces of chocolate below the restriction 246 is severed into sections which are assembled with cookies in the manner illustrated in FIG. 1 for the completion of the ice cream sandwiches.

The arrangement shown in FIG. 8 includes four feed belts 230 for feeding bits or pieces of chocolate or edible solid or particulate material to the column of ice cream but it is to be understood that a more or less number of belts 230 may be employed for the purpose.

It is apparent that, within the scope of the invention, modifications and different arrangements may be made other than as herein disclosed, and the present disclosure is illustrative merely, the invention comprehending all variations thereof.

We claim:

1. The method of processing freezable soft confection comprising advancing the soft confection as a column, establishing a quantity of particulate edible material adjacent the column of soft confection, agitating the particulate edible material, feeding the particulate edible material into contact with the peripheral region of the column of soft confection, moving the column of soft confection and particulate material through a restriction for impressing the particulate material into the peripheral region of the column of soft confection, severing successive bodies from the column of soft confection and particulate material embedded in the peripheral region thereof, delivering successive severed bodies onto successive cookies, and delivering each cooky and body of soft confection to a reduced temperature for freezing the bodies onto the cookies.

2. The method of processing soft ice cream comprising advancing the soft ice cream as a column, establishing a quantity of particulate edible material substantially surrounding the column of soft ice cream, agitating the particulate edible material, feeding the particulate edible material into contact with the peripheral region of the column of soft ice cream, moving the column of ice cream and particulate material through a restriction for impressing the particulate material into the peripheral region of the column of soft ice cream, severing successive sections from the column of soft ice cream and particulate material embedded in the peripheral region thereof, delivering successive severed sections onto successive cookies, and delivering the cooky and section of soft ice cream to a reduced temperature for freezing the sections on the cookies.

3. The method of processing soft freezable confection comprising advancing the soft confection in a vertical column, establishing a quantity of pieces of chocolate adjacent the column of soft confection, agitating the pieces of chocolate, feeding the pieces of chocolate into contact with the peripheral region of the column of soft confection, moving the column of soft confection and pieces of chocolate through a restriction for impressing the pieces of chocolate into the peripheral region of the column of soft confection, severing successive sections from the column of soft confection and pieces of chocolate embedded in the peripheral region thereof, delivering successive severed sections onto successive cookies, and delivering the assemblies of cookies and sections of soft confection to a reduced temperature for freezing the sections onto the cookies.

4. The method of processing soft ice cream comprising advancing the soft ice cream as a column, establishing a quantity of pieces of chocolate substantially surrounding the column of soft ice cream, agitating the pieces of chocolate, feeding the pieces of chocolate into contact with the peripheral region of the column of soft ice cream, moving the column of ice cream and pieces of chocolate through a restriction for impressing the pieces of chocolate into the peripheral region of the column of soft ice cream, severing successive sections from the column of soft ice cream and pieces of chocolate embedded in the peripheral region thereof, and subjecting the severed sections to a reduced temperature for freezing the sections.

5. The method of processing soft freezable confection comprising advancing a soft freezable confection downwardly in a substantially vertical column, establishing a quantity of particulate edible material in a chamber adjacent the column of soft freezable confection, agitating the particulate edible material in the chamber, feeding the particulate edible material from the chamber into contact with the peripheral region of the column of soft freezable confection, moving the column of soft freezable confection and particulate edible material through a restriction for impressing the particulate material into the peripheral region of the column of soft confection, severing successive sections from the column of soft freezable confection and particulate material embedded in the peripheral region thereof, delivering successive severed sections onto successive cookies, delivering successive cookies into engagement with the upper surfaces of the successive sections to form assembled sandwiches, and delivering the sandwiches to a reduced temperature for freezing the soft freezable sections and freezing the sections to the cookies.

6. The method of processing soft ice cream comprising advancing the soft ice cream in a substantially vertical column, establishing a quantity of particulate edible material in a chamber surrounding the column of soft ice cream, agitating the particulate edible material in the chamber, feeding the particulate edible material into contact with the peripheral region of the column of soft ice cream, moving the column of ice cream and particulate edible material through a restriction for impressing the particulate material into the peripheral region of the column of soft ice cream, severing successive sections from the column of soft ice cream and particulate material embedded in the peripheral region thereof, delivering successive severed sections onto successive cookies, delivering successive cookies into engagement with the upper surfaces of the successive sections to form ice cream sandwiches, and subjecting the ice cream sandwiches to a reduced temperature for freezing the ice cream sections and freezing the sections to the cookies.

7. The method of forming ice cream sandwiches comprising advancing a vertical column of soft ice cream, establishing a quantity of pieces of chocolate in a chamber adjacent the column of ice cream, agitating the pieces of chocolate, feeding pieces of chocolate from the chamber into contact with the column of ice cream, moving the column of soft ice cream and pieces of chocolate through a restriction for impressing the pieces of chocolate into the column of ice cream at a region below the chamber, successively delivering cookies from a supply onto a track system, advancing the cookies along the track system by a conveyor, severing successive sections of ice cream and embedded pieces of chocolate from the column of ice cream and successively depositing a severed section onto each of the cookies on the track system, advancing each of the cookies and its section of ice cream and pieces of chocolate along the track system by the conveyor, successively depositing a cooky upon each of the severed sections to form an ice cream sandwich, and subjecting the ice cream sandwiches to a reduced temperature environment for freezing the sections of ice cream and pieces of chocolate and freezing the cookies onto the sections of ice cream.

8. Apparatus for processing soft freezable confection comprising a tubular member through which soft freezable confection is advanced as a column, a walled chamber adjacent the tubular member having a quantity of particulate edible material therein, means for agitating the chamber so as to feed the particulate edible material from the chamber into contact with the column of soft freezable confection below the end of the tubular member, a tubular extension below and connected with the chamber for receiving the column of soft freezable confection and particulate edible material engaging the column of soft freezable confection, said tubular extension having a restriction for impressing the particulate edible material in the peripheral region of the column of soft freezable confection, means below the tubular extension for severing successive sections of freezable confection with particulate edible material embedded in the peripheral region of each of the sections, means applying a cooky onto each of the sections from a supply of cookies, and means for freezing the cookies and sections.

9. Apparatus according to claim 8 comprising a second supply of cookies, means for applying a cooky from the second supply of cookies on each of the severed sections to form assemblages of a severed section with two cookies, and means for freezing the soft freezable sections of the assemblages.

10. Apparatus for processing soft freezable confection comprising a tubular member through which soft freezable confection is advanced as a column, a walled chamber adjacent the tubular member having a quantity of particulate edible material therein, means for agitating the particulate edible material so as to feed the particulate edible material from the chamber into contact with the column of soft freezable confection below the end of the tubular member, a tubular extension below and connected with the chamber for receiving the column of soft freezable confection and particulate edible material engaging the column of soft freezable confection, said tubular extension having a restriction for impressing the particulate edible material in the peripheral region of the column of soft freezable confection, means below the tubular extension for severing successive sections of soft freezable confection with particulate edible material embedded in the peripheral region of each of the sections, means for applying each of the sections upon successive cookies advanced from a supply of cookies, and means for freezing the soft freezable confections.

11. Apparatus for processing soft freezable confection comprising a tubular member through which soft freezable confection is advanced as a column, a walled chamber adjacent the tubular member having a quantity of particulate edible material therein, means for agitating the particulate edible material so as to feed the particulate edible material into contact with the column of soft freezable confection below the end of the tubular member, a tubular extension below and connected with the chamber for receiving the column of soft freezable confection and particulate edible material engaging the column of soft freezable confection, said tubular extension having a restriction for impressing the particulate edible material in the peripheral region of the column of soft freezable confection, means below the tubular extension for severing successive sections of soft freezable confection with particulate edible material embedded in the peripheral region of each of the sections, and means for freezing the sections of soft freezable confection.

12. Apparatus for processing soft ice cream comprising a vertical tubular member through which soft ice cream is advanced as a column, a walled chamber adjacent the tubular member having a quantity of pieces of chocolate therein, means for agitating the pieces of chocolate in the chamber so as to feed pieces of chocolate from the chamber into contact with the column of soft ice cream immediately below the end of the tubular member, a tubular extension below and connected with the chamber for receiving the column of soft ice cream and pieces of chocolate engaging the column of soft ice cream, said tubular extension having a restricted portion for impressing the pieces of chocolate in the peripheral region of the column of soft ice cream, means below the tubular extension for severing successive sections of soft ice cream with bits of chocolate embedded in the peripheral region of each of the sections, and means for freezing the soft ice cream sections.

13. Apparatus for processing soft ice cream comprising a vertical tubular member through which soft ice cream is advanced as a column, a funnel-shaped member surrounding the vertically disposed tubular member, a chamber defined by the funnel-shaped member, means for feeding pieces of chocolate from a supply into the chamber, the walls of the funnel-shaped member being inclined downwardly and inwardly for advancing the pieces of chocolate, a tubular extension extending downwardly from the funnel-shaped member and of a diameter slightly greater than the diameter of the tube of soft ice cream moving through the extension member, a gap between the lower end of the tubular member and the upper end of the tubular extension through which pieces of chocolate may flow into contact with the column of soft ice cream, means for agitating the pieces of chocolate in the funnel-shaped chamber, a restriction at the lower end of the tubular extension for impressing pieces of chocolate into the peripheral region of the column of soft ice cream as the soft ice cream and the pieces of chocolate pass through the restriction, and means for severing sections of soft ice cream and pieces of chocolate from the column of soft ice cream and pieces of chocolate.

14. The combination according to claim 13 wherein the agitating means for the pieces of chocolate includes a vibrator for vibrating the funnel-shaped member.

15. The combination according to claim 13 including an adjustable valve member slidable upon the tubular member for regulating the flow of pieces of chocolate into contact with the column of soft ice cream, and means for adjusting the position of said valve member.

16. Apparatus for processing soft freezable confection comprising a vertically-disposed downwardly-extending tubular member in which soft freezable confection is advanced under comparatively low pressure, a funnel-shaped member surrounding the tubular member, a receptacle containing a supply of particulate edible material, means for feeding the particulate edible material from the receptacle to a chamber defined by the funnel-shaped member, the lower end of the funnel-shaped member having a tubular extension, the vertically-disposed tubular member terminating above the upper end of the tubular extension, the lower end of the tubular member having an inwardly-extending restriction for reducing the diameter of the column of soft freezable confection fed into the tubular extension, means for agitating the particulate edible material in the funnel-shaped member, a tubular slidable valve member surrounding a portion of the vertically-disposed tubular member, support members secured to the tubular extension and extending upwardly through openings in the funnel-shaped member, said slidable valve member having slots accommodating the upwardly-extending support members to facilitate slidable movements of the tubular slidable valve member surrounding the vertically-disposed tubular member, means for adjusting the position of said slidable valve member, said slidable valve member being adjustable for controlling the flow of particulate edible material from the funnel-shaped member into the space between the inner surface of the tubular extension and the tubular column of freezable confection in the tubular extension providing space for the particulate edible material to contact the column of freezable confection in the tubular extension, means for agitating the particulate edible material in the funnel-shaped member, an inwardly extending restriction formed at the lower end of the tubular extension whereby the particulate edible material is impressed into the column of soft confection at the region of the restriction on the tubular extension whereby the particulate edible material is embedded in the soft freezable confection, and means below the tubular extension for severing sections of the freezable confection and particulate edible material embedded therein from the column of freezable confection in the tubular extension.

17. The combination according to claim 16 wherein the agitating means for the particulate edible material includes an electrically actuated vibrator for vibrating the funnel-shaped member.

18. The method of processing soft freezable confection comprising advancing the soft freezable confection in a substantially vertical column, establishing a quantity of particulate edible material in a chamber adjacent the column of soft freezable confection, directing streams of air under low pressure through the particulate edible material in the chamber for agitating the particulate edible material, feeding the particulate edible material into contact with the peripheral region of the column of soft freezable confection, moving the column of soft confection and particulate material through a restriction for impressing the particulate edible material into the peripheral region of the column of soft freezable confection, and severing successive sections from the column of soft freezable confection and particulate edible material embedded in the peripheral region thereof.

19. The method according to claim 18 comprising delivering successive severed sections onto successive cookies, delivering successive cookies into engagement with the upper surfaces of the successive sections whereby each of the severed sections is between two cookies, and freezing the soft confections and freezing the soft confections to the cookies.

20. The method of processing soft ice cream comprising advancing the soft ice cream downwardly in a substantially vertical column, establishing a quantity of small pieces of chocolate in a chamber adjacent the column of soft ice cream, directing streams of air under low pressure through the quantity of pieces of chocolate for agitating the pieces of chocolate in the chamber, feeding the pieces of chocolate into contact with the peripheral region of the column of soft ice cream, moving columns of ice cream and pieces of chocolate through a restriction for impressing pieces of chocolate into the peripheral region of the column of soft ice cream, and severing successive sections from the column of soft ice cream and pieces of chocolate embedded in the peripheral region thereof.

21. Apparatus for processing soft freezable confection comprising a vertically-disposed downwardly-extending tubular member in which the soft freezable confection is advanced as a column under comparatively low pressure, a first funnel-shaped member surrounding the tubular member, a second funnel-shaped member surrounding the first funnel-shaped member and spaced from the first funnel-shaped member providing between the funnel-shaped members an air chamber, a cover for the chamber, means for feeding particulate edible material from a supply into the first funnel-shaped member, the lower end of the first funnel-shaped member having a tubular extension, the vertically-disposed tubular member terminating above the upper end of the tubular extension providing a space for feeding the particulate edible material in the first funnel-shaped member into contact with the column of soft freezable confection from the downwardly extending tubular member, said tubular extension being of an internal diameter greater than the diameter of the column of soft freezable confection, inlet means in communication with the chamber between the funnel-shaped members for delivering air under low pressure into the chamber between the members, a plurality of louvered openings in said first funnel-shaped member for directing streams of air from the chamber between the funnel-shaped members onto the particulate edible material to prevent bridging of the particulate edible material, said tubular extension having a restriction whereby the particulate edible material is impressed into the peripheral region of the column of soft freezable confection, and means below the tubular extension for severing sections of the soft freezable confection and particulate edible material embedded therein from the column of freezable confection in the tubular extension.

22. The method of processing soft freezable confection comprising advancing the soft freezable confection in a substantially vertical column, feeding particulate edible material from a supply into a chamber surrounding the column of soft freezable confection, advancing the column of soft freezable confection through a tubular extension of an internal diameter greater than the diameter of the column of soft freezable confection, flowing streams of air under low pressure in circular directions in said chamber to agitate the particulate edible material and prevent bridging of the particulate edible material in the chamber, the particulate edible material flowing from the chamber into the space between the column of soft freezable confection and the wall of the tubular extension, restricting the tubular extension for embedding the particulate edible material in the peripheral region of the column of soft freezable confection, and severing successive sections from the column of soft freezable confection and particulate edible material embedded in the peripheral region thereof.

23. Apparatus for processing soft freezable confection including a vertically-disposed tubular member, an inlet opening for the tubular member for supplying soft freezable confection into the tubular member, means providing a circular chamber surrounding the tubular member, inlet means for said chamber for supplying particulate edible material from a supply into the circular chamber, an inwardly extending restriction on the tubular member at its lower end for reducing the diameter of the column of soft freezable confection delivered from the tubular member, a tubular extension connected with the means providing the circular chamber and extending downwardly from the circular chamber, air inlet means opening into the chamber for establishing air streams moving in circular directions through the chamber for preventing bridging of the particulate edible material in the chamber, the particulate edible material in the chamber flowing into the space between the column of soft freezable confection delivered from the tubular member and the interior surface of the tubular extension wherein the particulate edible material contacts the peripheral regions of the column of soft freezable confection moving through the tubular extension, the tubular extension having a restriction whereby the particulate edible material is pressed into the column of soft freezable confection moving through the restriction, and means for severing sections of soft freezable confection and particulate edible material embedded therein at a region below the restriction of the tubular extension.

24. Apparatus according to claim 23 wherein the means providing the circular chamber is of plastic material.

25. Apparatus for processing soft freezable confection including a tubular member adapted to receive soft freezable confection under low pressure, the pressure advancing a column of soft freezable confection through the tubular member, a tubular extension aligned with the tubular member and spaced longitudinally from the end of the tubular member, the interior diameter of the tubular extension being greater than the diameter of the column of soft freezable confection delivered from the tubular member, means extending upwardly from the tubular extension defining a chamber surrounding a portion of the tubular member, a plurality of conveyor means adjacent the entrance of the chamber surrounding a portion of the tubular member, said conveyor means adapted to receive particulate edible material from a supply, said plurality of conveyor means being advanced in directions for conveying and delivering particulate edible material into the chamber surrounding a portion of the tubular member, said particulate edible material in the chamber moving downwardly through the chamber and the space between the inner surface of the tubular extension and the column of soft freezable confection moving through the tubular extension, said tubular extension having a restriction at its lower end whereby the particulate edible material is forced by the restriction into the peripheral region of the column of soft freezable confection moving through the tubular extension whereby the particulate edible material is embedded in the peripheral region of the column of soft freezable confection moving through the restriction, and means for severing successive sections from the column of soft freezable confection and particulate edible material embedded in the peripheral region thereof.

* * * * *